US012566976B2

(12) United States Patent
Alagappan et al.

(10) Patent No.: US 12,566,976 B2
(45) Date of Patent: Mar. 3, 2026

(54) MACHINE LEARNING SYSTEM FOR FORECASTING CUSTOMER DEMAND

(71) Applicant: HEWLETT PACKARD ENTERPRISE DEVELOPMENT LP, Spring, TX (US)

(72) Inventors: Kumar Alagappan, Bangalore (IN); Pradeep Kumar Venkataramu, Bangalore (IN); Aswinraj Govindaraj, Bangalore (IN); Sandy Ono, San Jose, CA (US); Shambhu Kumar, Bangalore (IN); Ashis Mondal, Bangalore (IN); Palani Balasundaram, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 688 days.

(21) Appl. No.: 17/984,024

(22) Filed: Nov. 9, 2022

(65) Prior Publication Data

US 2024/0152775 A1 May 9, 2024

(51) Int. Cl.
*G06N 5/022* (2023.01)
(52) U.S. Cl.
CPC .................................... *G06N 5/022* (2013.01)
(58) Field of Classification Search
None
See application file for complete search history.

(56) References Cited

U.S. PATENT DOCUMENTS

| | | | |
|---|---|---|---|
| 10,558,925 B1 * | 2/2020 | Flor ................... | G06Q 30/0202 |
| 2012/0284212 A1 * | 11/2012 | Lin ........................ | G06N 20/00 |
| | | | 706/12 |
| 2020/0151014 A1 | 5/2020 | Sukhi et al. | |
| 2020/0211041 A1 * | 7/2020 | Raudies ............. | G06Q 30/0206 |
| 2020/0258098 A1 | 8/2020 | Graciani et al. | |
| 2021/0125207 A1 | 4/2021 | Banerjee et al. | |
| 2022/0036387 A1 | 2/2022 | Papadimitriou et al. | |

FOREIGN PATENT DOCUMENTS

WO 2019/113122 A1 6/2019

OTHER PUBLICATIONS

Lazzeri, F. "Introduction to feature engineering for time series forecasting", Data Science at Microsoft, Oct. 5, 2021, pp. 14.

* cited by examiner

*Primary Examiner* — Kannan Shanmugasundaram
(74) *Attorney, Agent, or Firm* — Sheppard Mullin Richter & Hampton LLP

(57) ABSTRACT

The disclosure includes a system and methods of generating a forecast index based on customer digital intent data. The methods include generating a plurality of prediction models using a unique machine learning algorithm for each prediction model, determining an optimal prediction model based on an overall model score assigned to each model of the plurality of prediction models, and generating a forecast index based on the optimal prediction model. The forecast index can be used to adjusts the supply of one or more products based on predicted customer demand.

20 Claims, 9 Drawing Sheets

ENSEMBLE ENGINE 115

HARDWARE PROCESSORS 402

MACHINE-READABLE STORAGE MEDIA 404

ENSEMBLE FEATURE SELECTION 225

PERFORM RECURSIVE FEATURE ELIMINATION (RFE) 506

PERFORM BORUTA FEATURE SELECTION 508

PERFORM VARIABLE IMPORTANCE VIA RANDOM FOREST 510

700

RECEIVE CUSTOMER DIGITAL INTENT DATA FROM CLICK-STREAM DATABASE — 702

GENERATING A PLURALITY OF PREDICTIVE MODELS — 704

COMPARE EACH PREDICTIVE MODEL WITH PIPELINE DATA TO GENERATE AN OVERALL MODEL SCORE — 706

DETERMINE AN OPTIMAL PREDICTION MODEL BASED ON THE OVERALL MODEL SCORE — 708

GENERATE FORECAST INDEX — 710

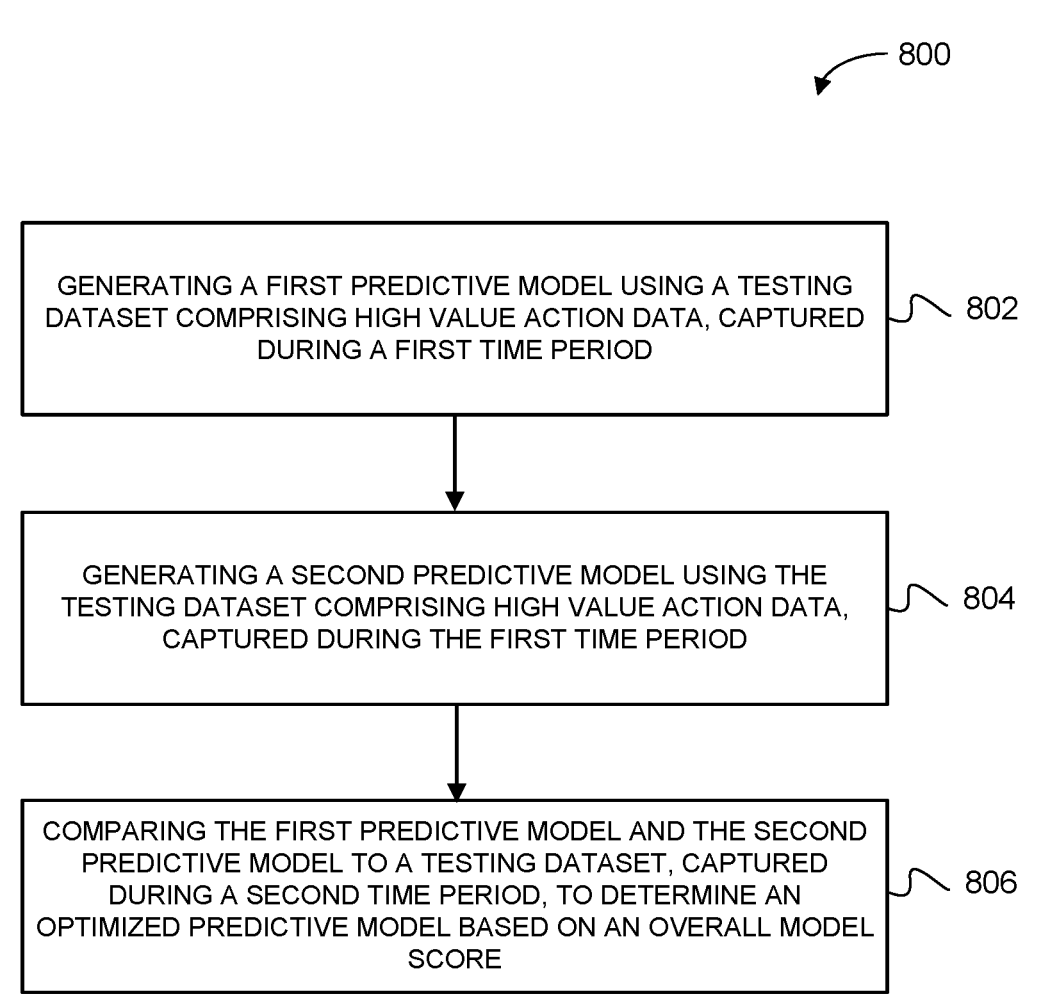

800

GENERATING A FIRST PREDICTIVE MODEL USING A TESTING DATASET COMPRISING HIGH VALUE ACTION DATA, CAPTURED DURING A FIRST TIME PERIOD          802

GENERATING A SECOND PREDICTIVE MODEL USING THE TESTING DATASET COMPRISING HIGH VALUE ACTION DATA, CAPTURED DURING THE FIRST TIME PERIOD          804

COMPARING THE FIRST PREDICTIVE MODEL AND THE SECOND PREDICTIVE MODEL TO A TESTING DATASET, CAPTURED DURING A SECOND TIME PERIOD, TO DETERMINE AN OPTIMIZED PREDICTIVE MODEL BASED ON AN OVERALL MODEL SCORE          806

FIG. 8

| Processor(s) 904 | | Network Interface(s) 918 |
| --- | --- | --- |

Bus
902

| Main Memory 906 | ROM 908 | Storage 910 |
| --- | --- | --- |

| Display 912 | Input Device(s) 914 | Cursor Control 916 |
| --- | --- | --- |

MACHINE LEARNING SYSTEM FOR FORECASTING CUSTOMER DEMAND

BACKGROUND

Forecasting customer demand is a cross-functional challenge that is fraught with difficulty. For example, supply chain management and marketing organizations often have issues correctly forecasting customer demand, which can result in inefficiency, incorrect financial plans, shortages, and other business problems. Customer demand is informed by a number of complex factors related to one another in complex ways. For example, on occasion customer demands lag customer actions. Machine learning (ML) models generated or created vis-à-vis an ML algorithm can be trained to forecast customer demand. These ML models can be trained with sampled data (e.g., training data) to make predictions or decisions without being explicitly programmed to do so. However, generating prediction models to accurately forecast future customer demand is difficult, even with ML algorithms. Prediction models often overfit and underfit training data resulting in predictions that may lack the desired accuracy. In the business context, ML challenges, such as overfitting and underfitting, will cause inaccurate predictions of customer demand, which can create significant supply chain problems, among other business challenges.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 8 illustrates an example method of generating a plurality of prediction models.

Figure 1:
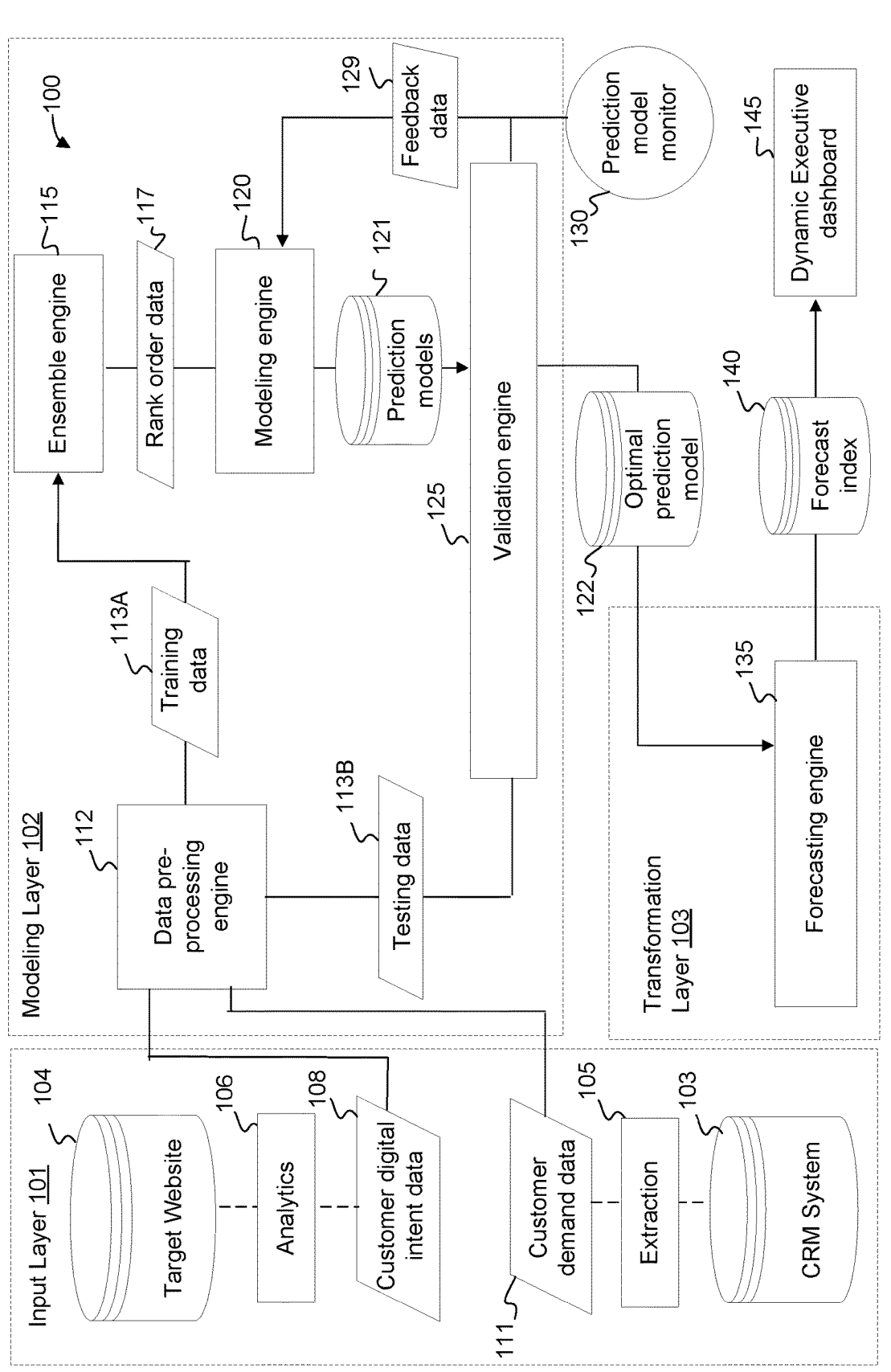
FIG. 1 illustrates an example process flow of a method for generating a forecasting index.

The figures are not exhaustive and do not limit the present disclosure to the precise form disclosed.

DETAILED DESCRIPTION

One of the primary objectives of various business functions, including the marketing function, is to determine customer demand. Most conventional supply chain management/marketing dashboards measure and report customer demand as lagging indicators of performance. However, this lag makes customer demand less desirable as a predictive indicator. Lag is the period of time between customer intent and customer demand. Customer intent is one or more actions a customer takes target digital marketplace that indicate the customer is considering making a purchase. Customer intent, however, is not and does not guarantee an actual purchase, but may or may not lead to an actual purchase. In some embodiments, such customer intent may be digital intent, which is one or more digital actions that can be observed/monitored (e.g. email views, clicks on a link, navigation to a webpage), and that may or may not lead to purchases on a target digital marketplace (e.g. website, application, program). In one example, the customer digital intent data is captured using an analytics platform/tool that captures such intent data from a target digital marketplace (or from multiple target digital marketplaces). Customer demand data can be, for example, extracted from a customer relations management (CRM) system. CRM systems track customer relationships with the target digital marketplace from a sales lead to a completed sale. In one configuration, customer demand is based on lead volumes that are entered into the CRM system. The lead volumes are converted into customer demand upon quantifiable sales (e.g., when sales are accepted by a sales team).

Customer demand is present or foreseeable customer orders or purchases. Customer demand can be characterized by customer demand data, such as records of orders or purchases. While customer demand could be analyzed in a time-series manner to predict future demand based on patterns in past demand, the value of such predictions rely heavily on the accuracy and continued applicability of patterns found in past customer demand data. Such prediction mechanisms struggle to capture changes in demand patterns, anomalous changes in demand, and latent thresholds in demand not captured by the modeled patterns.

Customer intent data, while not perfectly correlated with future demand, can indicate future demand, albeit with lag. The lag can include any amount of time. For example, the lag could be daily, weekly, quarterly, or fractions or multiples of any other period of time. Lag may not be uniform across different products, companies, or customers, or over time.

Often, supply chain management/marketing dashboards use lead volumes and opportunity pipelines to solely measure and report customer demand. These supply chain management/marketing dashboards, lack the ability to accurately predict/forecast customer demand due in part to the fact that, customer demand can lag customer intent. For example, product sales can occasionally lag customer actions on a target digital marketplace if a customer engages with a webpage but does not actually make a purchase from the webpage until some time passes. Although some ML algorithms have attempted to forecast customer demand, forecasting lagged customer demand is extremely difficult, since ML algorithms tend to overfit or underfit customer demand. For example, sometimes a temporary surge in customer intent can result in a ML algorithm forecasting a significant surge in demand. Without determining the relationship between customer intent and customer demand, ML algorithms can struggle with accurately forecasting periods of customer demand.

In an example system consistent with the teachings of this disclosure, both customer digital intent data and customer demand data are used to train and test prediction models to determine a relationship between the customer intent and customer demand. Here, sets of customer digital intent data and sets of customer demand data are used by the system to generate a plurality of prediction models. The system proposed herein can determine the relationship between customer intent and customer demand by generating multiple prediction models using sets of customer digital intent data and customer demand data. The relationship between the customer intent and customer demand can be used by supply chain management and marketing operations to increase the lead time to adjust the supply of products.

Each prediction model attempts to predict whether a relationship holds true between the customer digital intent data and the customer demand data. For example, a first prediction model may determine that the most likely lag between customer digital intent data and customer demand data for a specific product is 3 weeks. Each prediction model is trained using a training dataset comprising customer digital intent data and customer demand data, and validated using a testing dataset comprising customer digital intent data and customer demand data. In one configuration, a first training dataset and first testing dataset is used to train and validate each prediction model. In another configuration, a first training dataset and a second testing dataset is used for each model (e.g., each prediction model is trained and validated using a unique training dataset and testing dataset). Customer digital intent data used to generate training data and testing data includes customer high value actions. A "High value action" is defined as any action performed by the customer on a user interface (UI) that will likely result in a sale. The term "HVA data" can refer to captured data that is representative of the high value actions performed by the customer on the UI that will likely result in the sale. In order for an action to be considered/characterized as likely to result in a sale, that action should be similar to or the same as a previous customer action that results in an actual sale.

The system determines an amount of customer demand data to be used to generate training and testing datasets (the amount of customer demand data used to generate testing and training datasets is sometimes referred to as pipeline data). Each dataset includes weekly lagged HVA data (e.g., HVA data at 2 weeks, HVA data at 4 weeks, etc.). The one or more datasets of HVA data used as training data are hereafter referred to as "selected data." The one or more sets of HVA data used as testing data is hereafter referred to as "non-selected data."

Each prediction model is validated by a validator to determine an optimal prediction model. The prediction model that most accurately predicts the relationship between the customer digital intent data and the customer demand data is the optimal (i.e., most accurate) prediction model. During testing, the validator applies a testing dataset comprising non-selected sets of customer digital intent data and customer demand data to each prediction model of the plurality of the prediction models to determine the optimal predication model. It should be noted that the terms "optimize," "optimal" and the like as used herein can be used to mean making or achieving performance as effective or perfect as possible. However, as one of ordinary skill in the art will recognize, perfection cannot always be achieved. Accordingly, these terms can also encompass making or achieving performance as good or effective as possible or practical under the given circumstances, or making or achieving performance better than that which can be achieved with other settings or parameters. The degree of optimization can also be varied in accordance with user needs/desires. In the context of the present disclosure an optimal prediction model can refer to a prediction model that most accurately predicts the testing dataset when compared to the plurality of prediction models.

Non-optimal prediction models can be re-trained by the modeling engine using feedback data. For example, data regarding the non-optimal prediction models can be used by the modeling engine to continuously re-train the ML prediction models to generate more accurate prediction models.

The optimal model is used to generate a forecast index that can be used in a dynamic executive dashboard to display the most likely lag between the customer digital intent and the customer demand for specific products. For example, using the forecast index, a user (e.g., a business executive) can easily determine that demand for a product will surge in about 3 weeks. In one example, the forecast index is a chart comprising a plurality of data points that forecast customer activity (e.g., a chart of points plotted over time or volume). The plurality of data points can include a number of customer digital actions, coverage ratios, and average deal size per opportunity. Based on the forecast index, business executives can adjust the development or supply of a product.

FIG. 1 illustrates an example architecture for generating a forecasting index. Customer digital intent data 108 and customer demand data 111 are captured/generated at the input layer 101. Customer digital intent data 108 is captured/generated by an analytics tool from customer digital interactions on a target digital marketplace 104. In one example the target digital marketplace is HPE.com©. In one example, the customer digital intent data 108 is generated/using Adobe Analytics©. Customer demand data is extracted from a CRM system 103. The customer demand data 111 can be extracted from the CRM system using a variety of extraction techniques. In one example, the customer demand data is extracted using an extraction tool 105.

The customer digital intent data 108 includes HVAs. In one configuration HVAs include: unique visitors, visits, assert response starts, asset response completes, click to call, sales chart click, click to sales agent, sales agent form complete, reactive chat click, reactive chat connected, product catalog product view, how to buy, gated asset downloads, un-gates asset downloads, proactive chat click, proactive chat connected, video views, click to social sharing, site searches, cart additions, cart views, carts, store-submit quote, checkouts, product detail page view, product list page view, store-configuration start, store-configuration complete, store-category/subcategory view, site search result clicks, store-quote new, sign in complete, account registration starts, store-product compare page view. In one configuration, the HVAs include: asset metrics comprising: gated asset downloads, un-gated asset downloads, video views, asset response starts, and asset response completes; chat metrics comprising: reactive chat click, proactive chat click, sales chat click, reactive chat connected, and proactive chat connected; call metrics comprising: click to call, and click to sales agent; cart metrics comprising: cart additions, cart views, and carts; product related metrics comprising: product detail page view, product list page view, product catalog product view, and store-product compare page view; purchase intent metrics comprising: how to buy, store-submit quote and checkouts; and account metrics comprising: sign in to complete and account registration starts. In one configuration, the HVAs comprise one or more: number of unique visitors, number of visits, number of clicks to call, number of video views, and number of reactive and proactive chats.

The HVA data associated with HVAs is categorized, according to weekly timestamps (e.g., 6 weeks, 8 weeks, 10 weeks, and 12 weeks). The weekly timestamps of the HVA data are representative of the lag, in this case, weekly lag, used by the modeling engine in the modeling layer to predict the relationship between the customer digital intent data 108 and the customer demand data 111

Customer digital intent data 108 and customer demand data 111 are sent from the input layer 101 to the modeling layer 102, where they are used to generate a plurality of prediction models 121. The customer digital intent data 108 and the customer demand data 111 are received at the data pre-processing engine 112 where they are combined and lagged to according to various combinations. The data pre-processing engine uses customer digital intent data and customer demand data captured over a period of time (e.g., 2 weeks, 4 weeks, 6 weeks, 8 weeks) to generate the training dataset and testing dataset. The combination and lagging of data according to various time periods is hereafter referred to as "feature engineering."

Feature engineering is a process of merging customer digital intent data 108 with customer demand data 111 at weekly levels (e.g., 2 weeks, 4 weeks, etc.). To determine the appropriate relationship between customer digital intent data 108 and the customer demand data 111, the system creates multiple combinations of lagged datasets at weekly levels. The multiple combinations include multiple lagged variables from HVAs (e.g., four different variables from each lagged HVAs). In one example, for each individual HVA, 4 additional data points are created. Thus, assuming the existence of 30 HVA variables, 120 different variables may be generated. By generating additional variables, the system is better able to determine data-points that are indicative of the projected lag. The weekly lag can impact the model (e.g., a four week sum can impact a model more than a three week sum or a two week sum can impact a model more than a 4 week sum).

The system can determine the most accurate lag by generating a plurality of prediction models. In one example, each model is validated using a "goodness of fit measure", to determine which lagged dataset is the best fit or the best representation of the training data. The "goodness of fit measure" is a method of determining which prediction model most accurately predicts the relationship between the customer digital intent data and the customer demand data.

The pre-processing engine further generates training datasets 113A and testing datasets 113B based on the customer digital intent data 108 and customer demand data 111. To prevent overfitting and bias, the combined customer demand data and customer digital intent data is split into two datasets: (i) a training dataset and (ii) a testing dataset. The training data includes selected data comprising data points chosen to represent a plurality of lagged high value actions. The remaining non-selected data points are used as testing data. For example, in a matrix comprising a plurality of data values, a first portion of data taken from a first portion of the matrix is used to create training data and a remaining portion taken from a second portion of the matrix (e.g., the unused portion) is used to create testing data.

The training data 113A is sent to an ensemble engine 115, where it is rank ordered by the ensemble engine 115 to generate rank order data 117. Because the training data 113A includes a wide array of values captured over various times, rank ordering data 117 aids the plurality of ML algorithms in generating prediction models. For example, HVA data is assigned a relevance score that can be used to assess the relevance of the HVA data to the prediction model. In one embodiment, rank ordering further includes dimensionality reduction, which includes selecting the most relevant features, and ignoring irrelevant features when determining a feature rank order. Dimensionality reduction helps prevent overfitting by selecting and computing the most relevant HVA data. In one embodiment, combining the sets of models into the ensemble model includes determining a weighting of each model in the set of models based on a predictive power of the model. In one embodiment, the ensemble algorithm includes a plurality of ML algorithms comprising: a Recursive Feature Elimination (RFE) ML algorithm, a Boruta Feature Selection ML algorithm; and a Random Forest ML algorithm.

As seen further in FIG. 1, rank order data 117 is sent from the ensemble engine 115 to the modeling engine 120 to generate a plurality of prediction models 121. The prediction model uses the different lags created by the preprocessing engine to determine the best lag for the customer digital intent data. The modeling engine 120 includes a plurality of ML modeling algorithms. The ML modeling algorithms may include, but are not limited to, a Stepwise Regression ML algorithm, a Gradient Boost (GBM) ML algorithm, an Extreme Gradient Boost (XGBoost) ML algorithm, and a Random Forest ML algorithm. Each ML modeling algorithm generates a respective prediction model. For example, a first model may be generated using the Stepwise Regression ML algorithm, a second model may be generated using the GBM ML algorithm, a third model may be generated using the XGBoost ML algorithm, and a fourth model may be generated using the Random Forest algorithm. In one embodiment, each prediction model is generated by a combination of ML modeling algorithms. For example, in one configuration, more than one ML algorithm can be used to generate a prediction model (e.g., a stepwise regression algorithm and a random forest algorithm can be used to generate a prediction model).

The plurality of prediction models 121 comprise datasets representative of a computing system's (such as modeling engine 120's) interpretation of training data 113A, including the previously described data flow. A family of feature sets within each dataset can be selected using, for example, iterative feature addition, until no features contribute to the accuracy of the models beyond a particular threshold. To improve the overall model, certain features can be removed from the set of features and additional models can be trained on the remaining features.

Each prediction model's prediction is tested (i.e., validated) by a validator 125 to determine the accuracy of the prediction model to forecast customer demand using the training data 113A. Each prediction model from the plurality of prediction models is tested by comparing each prediction with testing data 113B. The validator 125 cross validates each modeling algorithm by applying a goodness of fit measurement (e.g., R-square, RSME, R-square SD, RSME SD, etc.) to each model to determine over-fitting of training data. Each prediction model is assigned a score to determine the accuracy of each prediction model. The validator 125 generates an overall model score by normalizing and generating an aggregated weighted goodness of fit index. The model with the highest overall model score is selected by the validator 125 and sent to the forecasting engine 135 in the transformation layer 103. The model with the highest overall model score is the optimal prediction model 122. In addition, sensitivity analysis of each prediction model can be performed to determine which HVA data 109 is the largest driver of a predicted outcome.

The testing data 113B is used by the validator 125 to test (i.e., validate) each prediction model to determine the most accurate prediction model (i.e., the optimal prediction model 122). To determine the accuracy of each prediction model, each prediction model of the plurality of prediction models 121 is tested at the validator 125 using testing data 113B.

The output of each prediction model 121 is charted against the testing data to determine the accuracy of each prediction model. The prediction model that most accurately predicts the relationship between the customer digital intent and the customer demand is the optimal prediction model.

In one configuration, the optimal prediction model 122 is the model that has the highest overall ranking. Each model is ranked by the validator according to a plurality of ranking factors to generate an overall ranking score. In one configuration, the plurality of ranking factors include the goodness of fit factors. The goodness of fit factors include a R-square measurement, a root mean squared (RSME) measurement, a R-square SD measurement, and a RSME SD measurement. The prediction model with the highest overall ranking score (i.e., the model that most accurately predicted the testing data) is the optimal prediction model 122. The optimal prediction model 122 is sent to the transformation layer 103, where it is used to generate a forecast index 140 comprising model digital actions 452.

Although not the preferred configuration, it is foreseeable that in one configuration where time is not required, the validator 125 can use a cross-validation technique to determine the accuracy of each prediction model. Here, the cross-validation is a resampling technique where the pipeline data is split into two parts (e.g., training data 113A, and a testing data 113B). The training data 113A is used to train the prediction models, and the testing data 113B is used to validate the predictions. The testing data 113B can be unseen testing data 113B.

Figure 2:
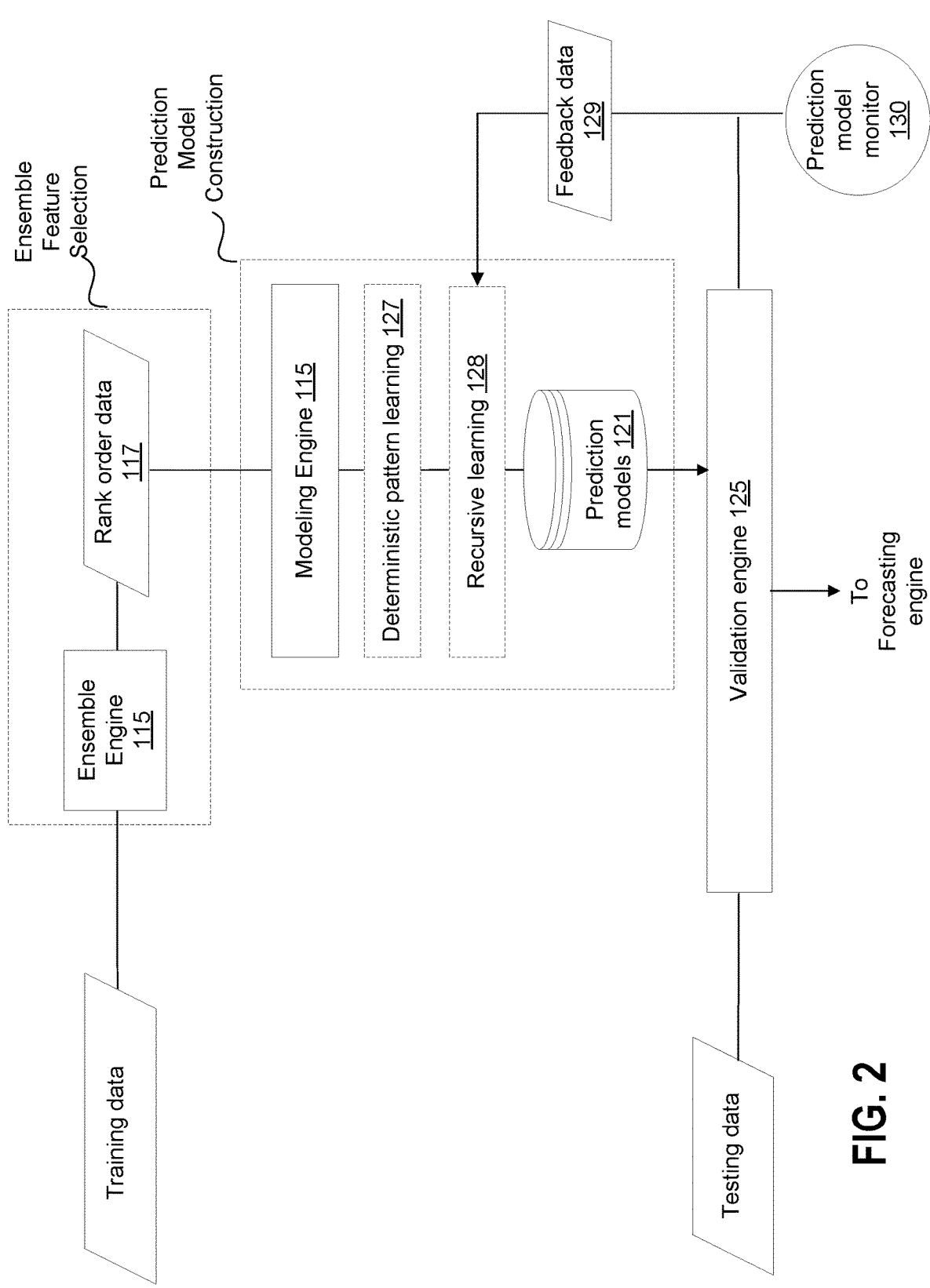
FIG. 2 illustrates an example architecture for generating a prediction model.

FIG. 2 illustrates an example architecture for generating a prediction model. The prediction model construction block includes a plurality of instructions for generating the plurality of prediction models. In one example, the plurality of instructions include instructions for: (i) ML prediction model generation 126, (ii) deterministic pattern learning 127, and (iii) recursive learning 128.

In addition to using one or more of the plurality of ML modeling algorithms to generate the plurality of prediction models, the system can apply deterministic pattern learning and recursive learning to tune each prediction model. Deterministic pattern learning is used to factor in uncertain dynamic environments into ML modeling algorithms to decrease over/under fitting. Without deterministic pattern learning, each prediction model may overshoot a prediction of customer demand by factoring in a temporary surge in customer demand. In one configuration, deterministic pattern learning includes one or more algorithms configured to represent a seasonality correction factor. The seasonality factor can be applied to each prediction model to prevent overshooting and undershooting customer demand, by smoothing (e.g., adjusting/altering) the data based on certain demand cycles. Without smoothing the training data, the plurality of prediction models 121 may undershoot customer demand following the uptick in seasonal demand, by over compensating for the apparent decreased customer demand. By smoothing out the data, each ML modeling algorithm can more accurately predict customer demand.

To make sure that the prediction models maintain a desired level of prediction accuracy, the prediction models are monitored by a prediction model monitor 130. The prediction model monitor 130 continuously monitors the efficacy of one or more models in a real-world environment (e.g., a production environment) by capturing data regarding the accuracy of the prediction model. The prediction model monitor 130 sends the captured data to the modeling engine for recursive learning 65 for recursive learning. The recursive learning uses the captured data to generate a normalized weighted rank based on a goodness-of-fit framework, which assists the processor in continuously selecting an appropriate prediction model and helps to reinforce learning, and guarantee stable performance.

Figure 3:
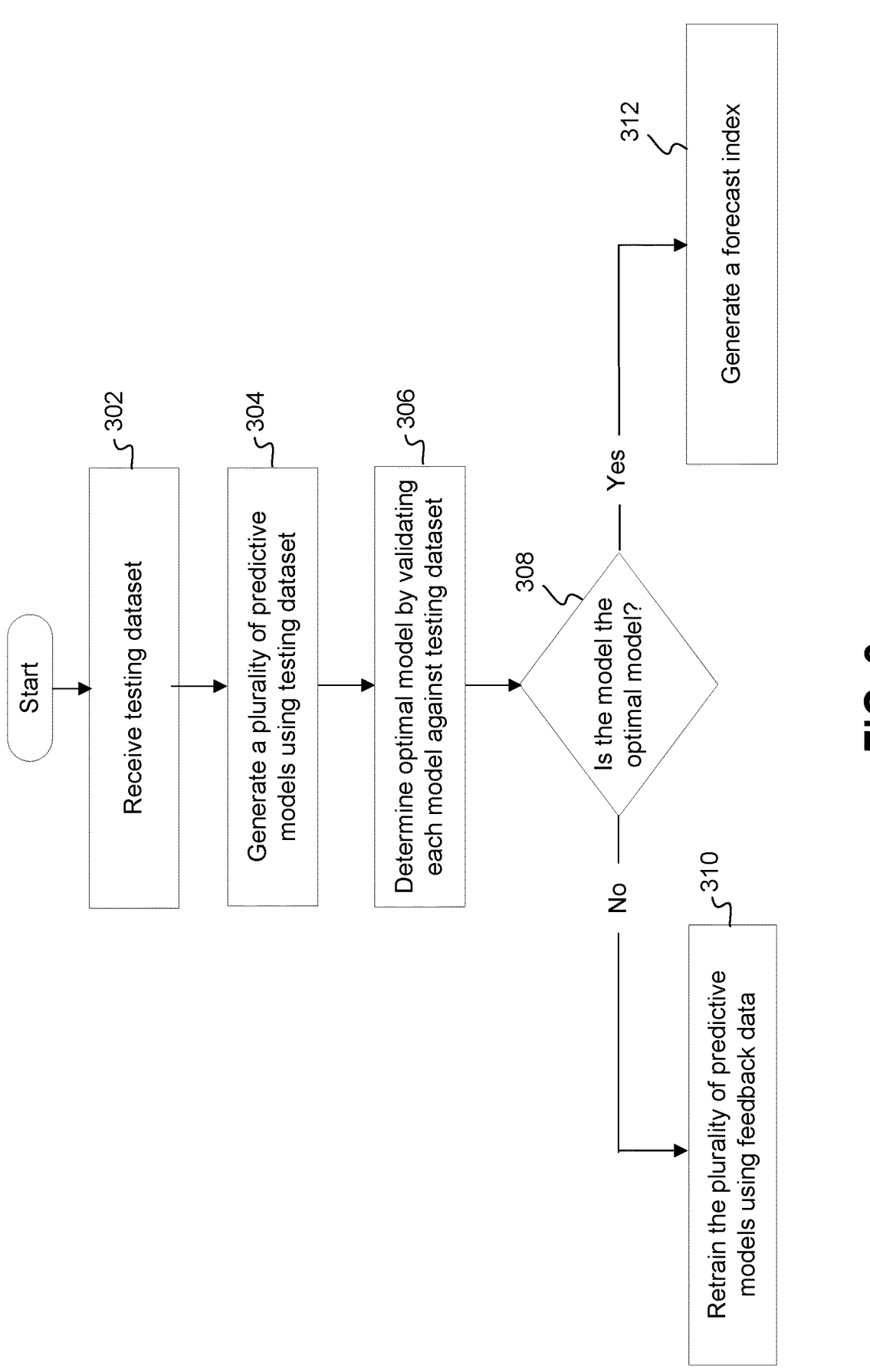
FIG. 3 illustrates an example method of generating a forecast index.

FIG. 3 is a method of model construction and validation. The method includes receiving pipeline data 111 comprising time specific HVA data 109, pre-processing the pipeline data 111 data to generate training data 113A and testing data 113B, generating a plurality of prediction models 121 using training data 113A, determining the optimal prediction model 122 by comparing each model to testing data 113B, generating a forecast index 140 based on the optimal prediction model 122, and retraining the non-optimal prediction models using feedback data 129.

At activity 302, the method 300 includes receiving customer digital intent data and customer demand data from the input layer 101. The customer digital intent data 108 include HVAs. The customer digital intent data 108 and the customer demand data 111 are received by the pre-processing engine 212 in the modeling layer 102.

At activity 304, the method 300 includes pre-processing the pipeline data 111 to generate training data 113A and testing data 113B. Here, the pre-processing engine 212 generates training data 113A, and testing data 113B. The training data 113A is used to generate the plurality of prediction models 121. The testing data 113B is used to determine the accuracy each prediction model. The most accurate prediction model is the optimal prediction model 122.

The testing data 113A is rank-ordered using the ensemble engine 115. The ensemble engine 215 uses the training data 113A to generate rank order data 117. As previously mentioned, the training data 113A includes lagged HVA data 109. The time lagged HVA data 109 is rank-ordered by the ensemble engine 215 to generate rank order data 117. The rank-ordered data 117 can be used to train the plurality of prediction models 121. In one embodiment, the ensemble-based ML algorithms include a Recursive Feature Elimination (RFE) ML algorithm, a Boruta Feature Selection ML algorithm, and a Random Forest ML algorithm.

At activity 306, the method 300 includes generating a plurality of prediction models using rank order data 117. The modeling engine 220 receives rank order data. The modeling engine 220 includes a plurality of ML algorithms. In one embodiment, the ML modeling algorithms include the stepwise regression ML algorithm, the GBM ML algorithm, the XGBoost algorithm, and the random forest ML algorithm. Each ML modeling algorithm generates a respective prediction model.

At activity 308, the method 300 includes determining the optimal prediction model 122 by validating each model against testing data. The optimal prediction model 122 is determined by cross-validating each model using a plurality of "goodness-of-fit" measures. Examples of goodness-of-fit measures include R-square, RSME, R-square SD, and RSME SD. Each goodness-of-fit measure is normalized and stored in an aggregated goodness-of-fit index. Each goodness-of-fit measure can be assigned a score. Each score can be aggregated in the goodness-of-fit index to generate an overall model score.

If the prediction model is the optimal prediction model 122, then the method includes activity 312. If the prediction model is a non-optimal model, then the method includes activity 314. At activity 310, one or more processors 904 determine whether or not a prediction model is an optimal prediction model 122 based on the overall score assigned to each model at activity 308. For example, the optimal prediction model 122 is a first prediction model with a first overall score that is higher than a second prediction model with a second overall score.

At activity 312, the method 300 includes retraining the plurality of prediction models 121 using testing data 113B. As seen in FIG. 1, non-optimal models can be re-trained (i.e., re-learned) with feedback data 129 to increase their prediction accuracy. Each prediction model can alter its prediction based on the feedback data 129.

At activity 314, the method 300 includes generating a forecast index 140 based on the optimal prediction model 122. The optimal prediction model 122 is sent from modeling layer 102 to the transformation layer 103, where it is received by the forecasting engine 235. The forecasting engine 135 generates a forecast index 140 based on the optimal prediction model 122. The forecast index 140 is an estimation of opportunity counts that can be generated due to the customer's digital intent data 106. The forecast index includes a plurality of data points that forecast customer activity. The plurality of data points can be plotted over time, or over volume. The plurality of data points can include a number of customer digital actions, coverage ratios, and average deal size per opportunity. The forecast index can be sent to a user dynamic dashboard 145 to adjust product supply based on the forecasted customer demand. The forecast index 140 includes modeled digital actions 452 that include coverage ratios, and average deal size per opportunity. The forecast index 140 allowed marketing teams to prepare for customer demand. For example, in one embodiment, a marketing team can use the forecast index 140 to determine whether customer demand is increasing or decreasing. In another embodiment, a logistics team can use the forecast index 140 to ramp up or ramp down production of a product according to projected demand.

Figure 4:
FIG. 4 illustrates an example computing component that may be used to generate a forecast index.
Figure 5:
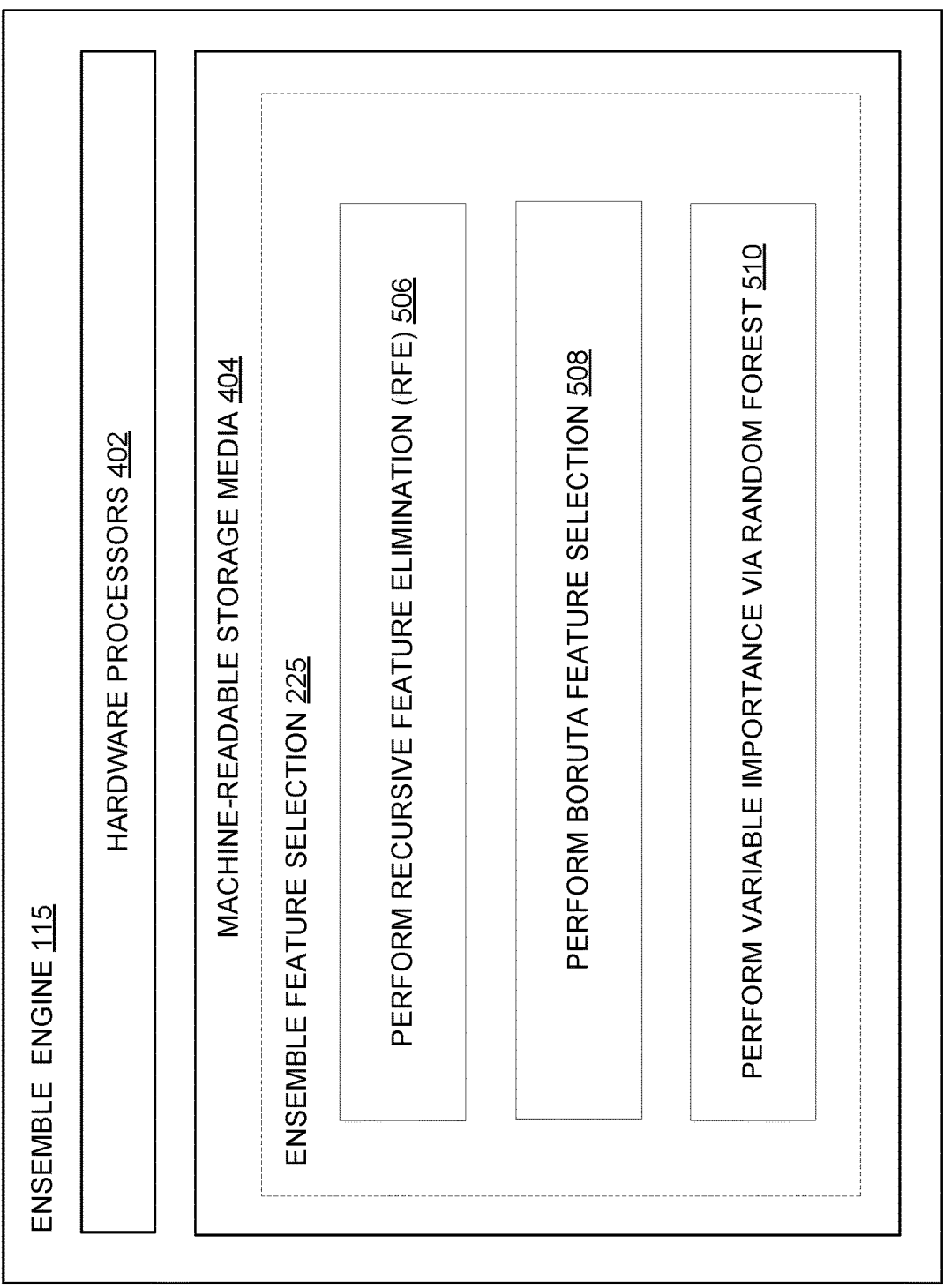
FIG. 5 illustrates an example computing component that may be used to generate an ensemble model.
Figure 6:
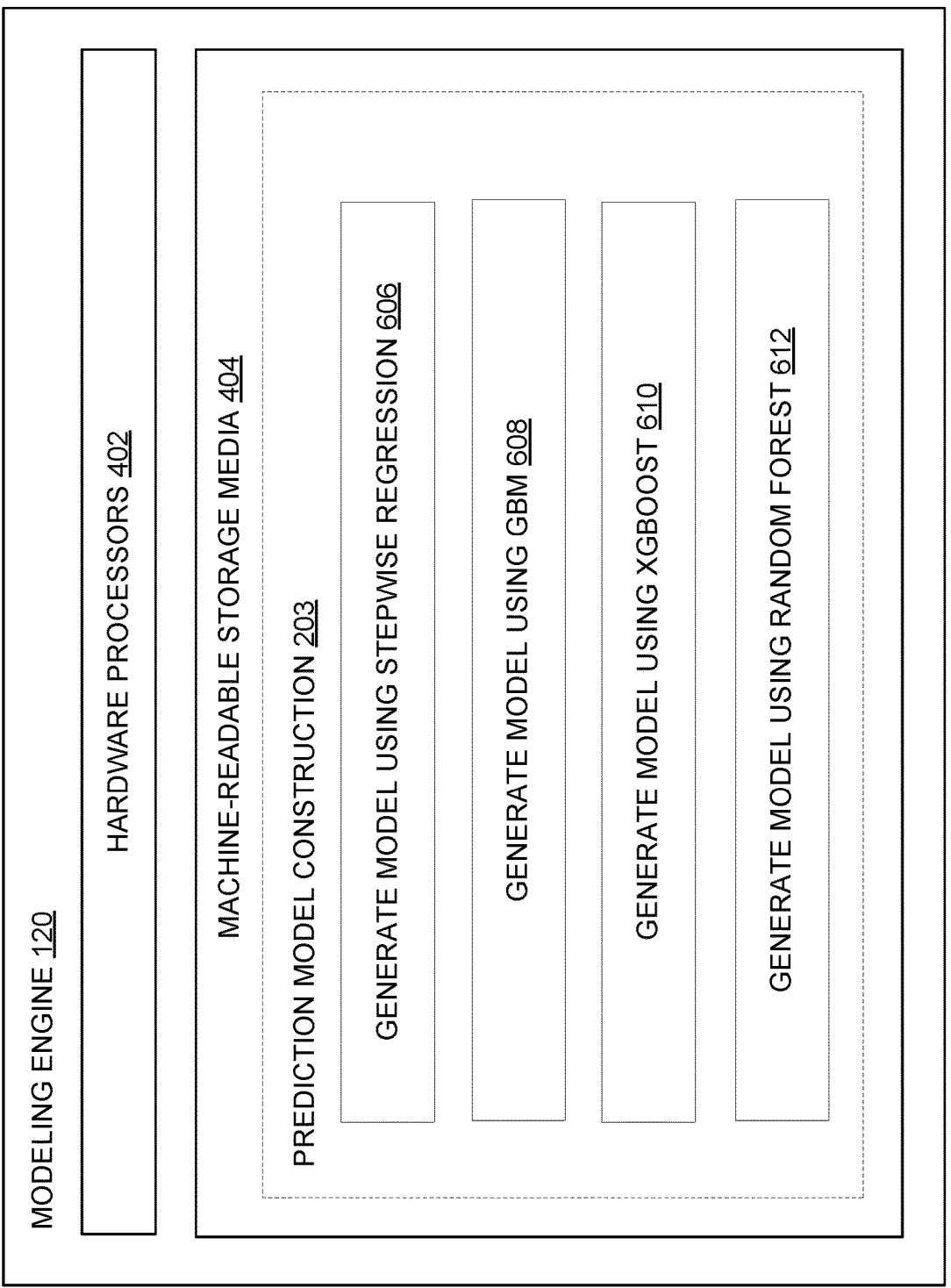
FIG. 6 illustrates an example computing component that may be used to generate a prediction model the forecast system.

FIGS. 4-6 illustrate an example computing component that may be used to generate a prediction model. Computing component 400 may be, for example, a server computer, a controller, or any other similar computing component capable of processing data. In the example implementation of FIGS. 4-6, the computing component 400 includes a hardware processor 402, and a machine-readable storage medium 404.

The hardware processor 402 may be one or more central processing units (CPUs), semiconductor-based microprocessors, and/or other hardware devices suitable for retrieval and execution of instructions stored in machine-readable storage medium. The hardware processor may be hardware processor 904. Hardware processor 402 may fetch, decode, and execute instructions, such as instructions 406-410, to control processes or operations for implementing the dynamically modular and customizable computing systems. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals.

As seen in FIG. 4, the machine-readable storage medium 404 may be encoded with executable instructions, for example, blocks 452-454 comprising instructions to model digital actions and generate a forecast index 425. The forecasting engine 135 generates a forecast index 140 based on the optimal prediction model 122. The forecast index 140 is an estimation of future sales opportunities (i.e., future high value action data 109) that can be generated due to the customer's digital intent data 106. The forecast index includes a plurality of data points that forecast customer activity. The plurality of data points can be plotted over time, or over volume. The forecast index 140 includes modeled digital actions 452 that include coverage ratios, and average deal size per opportunity.

As seen in FIG. 5, the machine-readable storage medium 404 may be encoded with executable instructions, for example, blocks 506-510 comprising instructions to perform a Recursive Feature Elimination, a Boruta Feature Selection, and a variable importance calculation. The ensemble engine 115 is programmed to use ensemble-based ML algorithms to rank order testing data comprising time specific HVA data 109. Features from the data (e.g., HVAs) can be selected from the testing data to train the prediction models. Ensemble learning is employed to use multiple trained models to obtain better predictive performance than could be obtained from any individual constituent trained model. Ensembles are capable of yielding better results when there is a significant diversity among the models. Here, the ensemble learning combines multiple hypotheses to form a better hypothesis. For example, in one embodiment, the ensemble engine 115 includes a Recursive Feature Elimination (RFE) algorithm, a Boruta Feature Selection algorithm, and a Random Forest algorithm. Ensembles are capable of yielding better results when there is a significant diversity among the models. Therefore, disparate datasets from the plurality of data sources are can be beneficial in providing diversity among the models the ensembles combine.

Block 506 includes instructions to perform a Recursive Feature Elimination (RFE). RFE is a feature selection ML algorithm that selects a subset of the most relevant features of a dataset. In one embodiment, the feature selection ML algorithm is executed by hardware processor 402 of the ensemble engine 115. Here, the RFE receives the training data 113A, as an input, and outputs rank order data 117. The RFE algorithm systematically searches through the training data 113A to generate rank order data 117 from HVA data 109. In one example, rank order data 117 includes HVA data 109 rank ordered according to the time of the action. The RFE is complete once all testing data is rank ordered.

Block 508 includes instructions to perform Boruta Feature Selection (BFS). BFS is a feature selection ML algorithm that works as a wrapper algorithm around a random forest ML algorithm. The Boruta Feature Selection algorithm is executed by hardware processor 402 of the ensemble engine 115. Here, the BFS receives the training data 113A, and outputs rank order data 117. Specifically, the BFS randomizes the training data 113A by creating shuffled copies of all features (i.e., shadow features). The BFS algorithm trains a Random Forest classifier to recognize and classify customer digital intent data by applying a feature importance measure to evaluate the importance of each lagged HVA data. At every iteration, the Boruta algorithm checks whether each HVA data has a higher importance than the shadow feature.

If the HVA data does not have a higher importance, it is rejected. If the HVA data has a higher importance it is confirmed. The BFS is complete once each HVA data is confirmed or rejected.

Block 510 includes instructions to perform a variable importance calculation by a Random Forest ML algorithm (i.e., a Gini Importance algorithm). The Gini Importance ML algorithm is executed by hardware processor 402 of the ensemble engine 115. The gini importance algorithm receives training data 113A as an input, and outputs rank order data 117 as an output. Specifically, the Gini Importance algorithm receives the training data 113A and feeds the pipeline data 111 into the Random Forest algorithm. However, unlike traditional Random Forest algorithms, the Gini Importance algorithm returns an plot of the important features (e.g., the time lagged HVA data). The Random Forest ML algorithm outputs rank-ordered data 117.

As seen in FIG. 6, the machine-readable storage medium 404 may be encoded with executable instructions, for example, blocks 606-612 comprising: instructions to generate a prediction model using a Stepwise Regression ML algorithm; instructions to generate a prediction model using a GBM ML algorithm; instructions to generate a prediction model using an XGBoost ML algorithm; and instructions to generate a prediction model using a Random Forest ML algorithm.

Block 606 includes instructions to generate a prediction model using a Stepwise Regression ML algorithm. The Stepwise Regression ML algorithm is a step-by-step iterative construction of a regression model that involves selection of independent variables to be used in a final model. The Stepwise Regression ML algorithm is executed by hardware processor 402 of the modeling engine 120. The Stepwise Regression ML algorithm receives rank order data 117, as an input and generates a prediction model as an output. The prediction model is sent to the validator 125 where a model performance validation operation is conducted on the prediction model to determine the accuracy of the prediction model. The Stepwise Regression ML algorithm performs a regression operation on rank order data 117 to determine one or more values that can be used to generate a prediction model.

Figure 7:
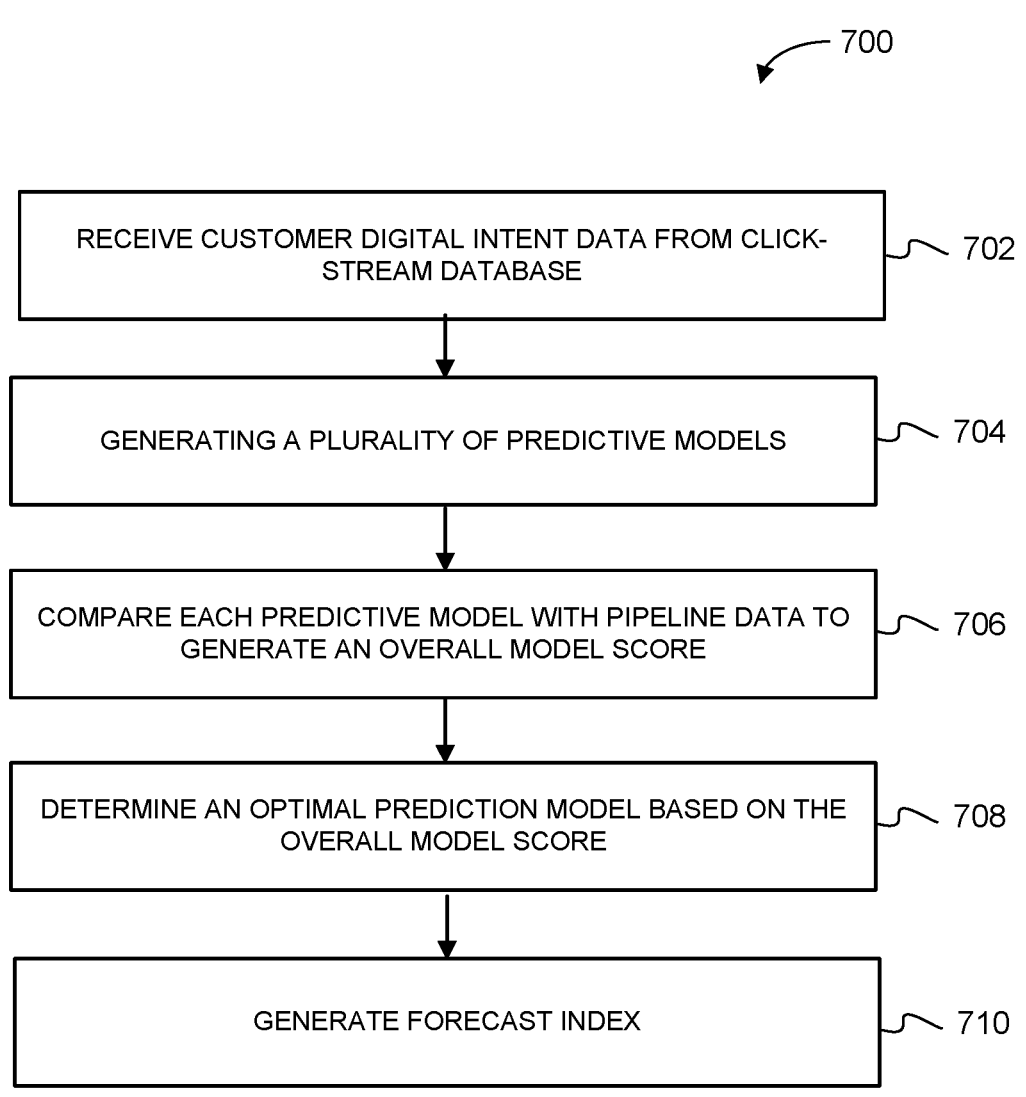
FIG. 7 illustrates an example method of forecasting customer digital intent data.

FIG. 7 illustrates an example method of forecasting the relationship between customer intent and customer demand. The method 700 includes receiving customer digital intent data 108 and customer demand data 111 at a pre-processing engine. The customer digital intent data 108 includes time-lagged HVA data. The customer digital intent data 108 and the customer demand data 108 are used by the pre-processing engine to generate training data 113A, and testing data 113B. The ensemble engine 115 uses the training data 113A to generate rank order data 117. The rank order data 117 is used by the modeling engine 120 to generate a plurality of prediction models 121. The rank order data 117 comprises a ranked order of the training data 113A comprising time-specific customer HVAs. As explained in further detail below, the modeling engine 120 uses rank order data 117 to generate a plurality of prediction models 121. Each prediction model of the plurality of prediction models 121 is generated using a unique ML algorithm. Once generated, each prediction model is sent to the validator 125 and assigned an overall model score. The overall model score is based on each model's ability to correctly predict testing data 113B. The prediction model with the highest overall model score (i.e., the most accurate model) is the optimal prediction model 122. The optimal prediction model 122 is sent to the forecasting engine 135 where it is used to generate a forecast index 140. The forecast index 140 can be used to adjust the supply of one or more products based on the forecasted customer demand.

At activity 702, the method 700 includes receiving customer digital intent data 108 and customer demand data 111. The customer digital intent data 108 includes data regarding customer interactions on a target digital marketplace. Customer interactions include any customer actions that can result in a purchase of a product (e.g., clicking an icon of a product, or selecting an item of interest). In one example, the customer digital intent data is gathered at weekly increments over a two year period. Customer demand data 111 is extracted from a CRM system 103.

At activity 704, the method 700 includes generating training data 113A and testing data 113B. Customer digital intent data and customer demand data is/are received by the data pre-processing engine 212 at the modeling layer 102. The customer digital intent data includes HVAs. The customer digital intent data and customer demand data are combined by the pre-processing engine 212 to generate training data 113A, and testing data 113B.

At activity 706, the method 700 includes generating a plurality of prediction models 121. Before generating the plurality of prediction models 121 pipeline data is rank-ordered by an ensemble engine 115. In one example, the ensemble engine 115 uses a combination of the Recursive Feature Elimination (RFE) algorithms, Boruta Feature Selection algorithms, and a Random Forest algorithms to generate rank order data 117. The rank order data 117 is used by the modeling engine 120 generate the plurality of prediction models 121. In one example, the modeling engine 120 uses a plurality of ML modeling algorithms comprising stepwise regression ML algorithms, GBM ML algorithms, XGBoost ML algorithms, and Random Forest algorithms. Each ML modeling algorithm generates a respective prediction model. Each prediction model is sent from the modeling engine 120 to the validator 125 to determine the accuracy of each prediction model.

At activity 708, method 700 includes determining the accuracy of each model (i.e., validating each model) to determine which model is the optimal prediction mode 122. The optimal prediction model 122 is the model that most accurately predicts the testing data 113B. As previously mentioned, the modeling engine 120 sends the plurality of prediction models 121 to the validator 125, and the validator 125 receives the plurality of prediction models 121 from the modeling engine 120. The validator 125 charts the prediction of each prediction model to testing data 113B to determine which model is most accurate (e.g., the optimal prediction model 122).

At activity 710, the method 700 includes determining the optimal prediction model based on the overall model score. The optimal prediction model 122 is the model that has the highest overall ranking. Each prediction model is ranked according to an plurality of ranking factors (i.e., goodness of fit factors) to generate an overall ranking score to determine which model is the most accurate. The model that most accurately predicts the testing data 113B (e.g., the model with the highest overall ranking score) is the optimal prediction model 122.

At activity 712, the method 700 includes generating a forecast index 140. The optimal prediction model 122 is used to generate a forecast index 140. The forecast index 140 is a chart comprising a plurality of data points that forecast customer activity. The plurality of data points can be plotted over time, or over volume. The plurality of data points can include a number of customer digital actions, coverage ratios, and average deal size per opportunity. The forecast index 140 can be sent to a user dynamic dashboard 145 to adjust product supply based on the forecasted customer demand.

FIG. 8 illustrates a method 800 of forecasting customer demand. The method 800 includes generating a first prediction model using training data 113A captured during a first time period, and generating a second prediction model using training data 113A captured during the first time period. The method 800 further includes comparing the first prediction model and the second prediction model to testing data 113B captured during a time second period, to generate an overall prediction model score for each prediction model, and generating an optimal prediction model 122 based on the overall model score for each prediction model. Both the first prediction model and the second prediction model are fed the same training data 113A and testing data 113B, thus allowing the validator to implement a consistent scoring method to determine the optimal prediction model.

At activity 802, the method 800 includes generating a first prediction model using training captured during a first time period. In one embodiment, the modeling engine 120 receives rank ordered data 117 from the ensemble engine 115. For example, a number of cart additions of a particular item from a website during a first time. The first time can include a moment in time, or a span of time. For example, the first time can include a first week. The rank ordered data 117 is used by the modeling engine 120 to generate a first prediction model using a ML modeling algorithm. The modeling engine 120 can include hardware processors 402, or 904. The ML modeling algorithm can include any ML algorithm capable of using training data 113A to generate a prediction model. For example, the first prediction model can be generated using the stepwise regression ML algorithm, algorithm or a the GBM ML algorithm, the XGBoost ML algorithm or the random forest ML algorithm.

At activity 804, the method 800 includes generating a second prediction model using training data 113A captured during the first time period. As described in activity 802, the modeling engine 120 receives rank ordered data 117 from the ensemble engine 115 to generate a second prediction model using a ML modeling algorithm. However, unlike activity 802, the second prediction model is generated using a different ML modeling algorithm than the method used at activity 802. For example, if a first prediction model is generated at activity 802 using the stepwise regression ML algorithm, then the modeling engine 120 will generate a second prediction model using the XGBoost ML algorithm. By generating the plurality of prediction models 121 using a plurality of methods (i.e., the prediction model is generated using a unique ML modeling algorithm in comparison to the second prediction model), each model can tested to determine which ML method most accurately predicts testing data 113B. Both the first prediction model of activity 802, and the second prediction model of activity 804 are sent as prediction models from the modeling engine 120 to the validator 125.

At activity 806, the method 800 includes comparing the first predictive model and the second predictive model to testing data 113B, captured during a second time period, to determine an optimal predictive model 122 based on an overall model score. To determine an optimal predictive model 122, the validator 125 compares each prediction model to testing data 113B. The most accurate prediction model is the optimal prediction model 122. By testing each prediction model against the testing data 113B, the non-optimal prediction model can be retroactively tuned to improve prediction accuracy. For example, non-optimal prediction models can be re-trained using feedback data 129 to re-train each prediction model. In one configuration, the optimal prediction model 122 is the model that has the highest ranking score based on goodness of fit. Here, each model is ranked according to an plurality of goodness of fit factors to generate an overall ranking score to determine which model is the most accurate. The model with the highest overall ranking score is the optimal prediction model. In one embodiment, the goodness of fit factors include a R-square measurement, a root mean squared (RSME) measurement, a R-square SD measurement, and a RSME SD measurement.

Once an optimal prediction model 122 is determined in the modeling layer 102, the optimal prediction model 122 is sent to the forecasting engine 135 in the transformation layer 103. The optimal prediction model 122 is used to generate a forecasting index 136 that includes the modeled digital actions 452. The forecasting index 136 can be used to adjust supply chain management and logistics to optimize product distribution based on predicted demand.

Figure 9:
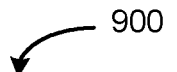
FIG. 9 illustrates a block diagram of an example computer system in which the systems and methods described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918. The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer implemented method of generating a forecast index comprising:

training each of a plurality of machine learning algorithms using training data, the training data comprising time lagged digital high value actions performed by one or more customers that will likely result in a sale of one or more products;

generating, pursuant to the training, a plurality of prediction models;

selecting an optimal prediction model from the plurality of prediction models that most accurately predicts a relationship between customer digital intent data reflected by time lagged digital high value actions and a customer demand reflected by a present or foreseeable purchase of the one or more products, the optimal prediction model being selected based on an overall model score assigned to each prediction model of the plurality of prediction models by a validator configured to test an accuracy of each prediction model by comparing each prediction to testing data;

executing the optimal prediction model; and generating a forecast index based on the optimal prediction model, the generated forecast index being a basis for adjusting a supply of one or more products based on a most likely lag between customer digital intent and customer demand for the one or more products.

2. The method of claim 1, wherein the time lagged digital high value customer interactions comprise one or more of: (i) number of unique visitors, (ii) number of visits, (iii) number of clicks to call, (iv) number of video views, or (v) number of reactive and proactive chats.

3. The method of claim 1, further comprising: rank ordering high value action data before generating the plurality of prediction models.

4. The method of claim 3, wherein the high value action data is rank ordered using an ensemble based feature selection method.

5. The method of claim 4, wherein the plurality of machine learning methods comprises one or more of: (i) a Recursive Feature Elimination machine learning method; (ii) a Boruta Feature Selection method; and (iii) a Random Forest machine learning method.

6. The method of claim 1, further comprising determining high value actions from customer digital intent data.

7. The method of claim 6, further comprising gathering customer digital intent data and customer demand data.

8. The method of claim 6, wherein customer digital intent data is captured from a target digital marketplace.

9. A system for generating a forecast index comprising:

a memory; and one or more processors that are configured to execute machine readable instructions stored in the memory for performing a method comprising:

generating training data and testing data from customer digital intent data reflected by time lagged digital high value actions performed by one or more customers that will likely result in a sale of one or more products and customer demand data reflected by a present or foreseeable purchase of the one or more products;

rank ordering the training data to generate a rank order data;

generating a plurality of prediction models using a plurality of machine learning methods, each prediction model of the plurality of prediction models being generated using a unique machine learning method;

determining an optimal prediction model that most accurately predicts a relationship between customer digital intent data reflected by time lagged digital high value actions and a customer demand reflected by a present or foreseeable purchase of the one or more products based on an overall model score assigned to each prediction model of the plurality of prediction models;

executing the optimal prediction model; and generating a forecast index based on the optimal prediction model, wherein the forecast index is a basis for adjusting a supply of one or more products based on a most likely lag between customer digital intent and customer demand for the one or more products.

10. The system of claim 9, wherein determining an optimal prediction model includes determining an accuracy of each prediction model by comparing each prediction to digital customer interactions.

11. The system of claim 9, wherein rank ordering data includes rank ordering data according to a high value action.

12. The system of claim 9, wherein the plurality of machine learning methods comprise one or more of: (i) a Recursive Feature Elimination machine learning method; (ii) a Boruta Feature Selection method; and (iii) a Random Forest machine learning method.

13. A customer demand forecasting device comprising:

a memory; and one or more processors configured to execute machine readable instructions stored in memory for performing a method comprising:

training a plurality of unique machine learning algorithms using training data comprising time-lagged digital high value actions performed by one or more customers that will likely result in a sale of one or more products;

generating, pursuant to the training, a plurality of prediction models;

determining an optimal prediction model that most accurately predicts a relationship between customer digital intent data reflected by time lagged digital high value actions and a customer demand reflected by a present or foreseeable purchase of the one or more products based on an overall model score assigned to each prediction model of the plurality of prediction models by testing an accuracy of each prediction model by comparing each prediction to testing datasets comprising time-lagged customer digital intent data and customer digital demand data;

executing the optimal prediction model; and generating a forecast index based on the optimal prediction model as a basis for adjusting a supply of one or more products based on a most likely lag between customer digital intent and customer demand for the one or more products.

14. The customer demand forecasting device of claim 13, wherein digital high value actions comprise one or more: (i) number of unique visitors, (ii) number of visits, (iii) number of clicks to call, (iv) number of video views, and (v) number of reactive and proactive chats.

15. The customer demand forecasting device of claim 13, further comprising: rank ordering pipeline data before generating the plurality of prediction models.

16. The customer demand forecasting device of claim 15, wherein the pipeline data is rank ordered using an ensemble based feature selection method comprising a plurality of machine learning methods.

17. The customer demand forecasting device of claim 16, wherein the plurality of machine learning methods comprise one or more of: (i) a Recursive Feature Elimination machine learning method; (ii) a Boruta Feature Selection method; (ii) and a Random Forest machine learning method.

18. The customer demand forecasting device of claim 13, further comprising determining high value actions from customer digital intent data.

19. The customer demand forecasting device of claim 18, further comprising sorting high value actions according to a date that the action occurred.

20. The customer demand forecasting device of claim 18, wherein customer digital intent data is received from a third-party database.

* * * * *